(12) United States Patent
Ritter et al.

(10) Patent No.: US 10,136,196 B2
(45) Date of Patent: Nov. 20, 2018

(54) CONNECTOR BRICK FOR CABLE COMMUNICATION SYSTEM

(71) Applicant: TE CONNECTIVITY CORPORATION, Berwyn, PA (US)

(72) Inventors: Christopher David Ritter, Hummelstown, PA (US); Robert Paul Nichols, Vacaville, CA (US); Jared Evan Rossman, Dover, PA (US); Jeffrey Stewart Simpson, Mechanicsburg, PA (US); Joshua Tyler Sechrist, Etters, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/700,683

(22) Filed: Sep. 11, 2017

(65) Prior Publication Data
US 2017/0374435 A1    Dec. 28, 2017

Related U.S. Application Data

(63) Continuation of application No. 14/550,462, filed on Nov. 21, 2014.

(51) Int. Cl.
*H04Q 1/02* (2006.01)
*H01R 13/6587* (2011.01)

(52) U.S. Cl.
CPC .......... *H04Q 1/15* (2013.01); *H01R 13/6587* (2013.01)

(58) Field of Classification Search
CPC .............................. H01R 13/6587; H04Q 1/15
(Continued)

(56) References Cited

U.S. PATENT DOCUMENTS 4,432,604 A    2/1984  Schwab
6,822,874 B1   11/2004 Marler
(Continued)

FOREIGN PATENT DOCUMENTS

CN    103378516 A    10/2013
CN    103384038 A    11/2013
(Continued)

OTHER PUBLICATIONS

U.S. Appl. No. 14/550,462, filed Nov. 21, 2014; and associated prosecution history.
(Continued)

*Primary Examiner* — Michael A Lyons
*Assistant Examiner* — Milagros Jeancharles

(57) ABSTRACT

A connector brick for a cable communication system includes a header frame including end spacers and side spacers defining a header opening. The header frame is configured for mating with a circuit card. A plurality of cable connectors are received in the header opening and connected to the header frame. Each cable connector has cables extending therefrom. Each cable connector has a header holding signal contacts at a mating end of the header and configured for mating with a corresponding card connector of the circuit card. Float mechanisms extend from the header frame. The float mechanisms allow limited movement in at least two directions of the header frame. The float mechanisms allow alignment of the header frame with the circuit card. The cable connectors float with the header frame as a unit for mating with the corresponding card connectors.

20 Claims, 6 Drawing Sheets

(58) Field of Classification Search
USPC .................. 439/65, 246–248, 638, 540.1
See application file for complete search history.

(56) References Cited

U.S. PATENT DOCUMENTS

| | | |
|---|---|---|
| 6,910,924 B1 | 6/2005 | Marion et al. |
| 7,878,860 B1 | 2/2011 | Ouellette et al. |
| 7,907,419 B2 | 3/2011 | Costello |
| 8,506,323 B2 | 8/2013 | Costello |
| 8,579,636 B2 | 11/2013 | Davis et al. |
| 8,662,924 B2 | 3/2014 | Davis et al. |
| 8,672,708 B2 | 3/2014 | Ritter et al. |
| 8,777,663 B2 | 7/2014 | Annis et al. |
| 8,870,594 B2 | 10/2014 | McClellan et al. |
| 9,017,087 B1 | 4/2015 | Rossman |
| 9,155,217 B2 | 10/2015 | Sechrist et al. |
| 9,232,676 B2 | 1/2016 | Sechrist et al. |
| 9,312,637 B2 | 4/2016 | Simpson et al. |
| 9,326,417 B2 | 4/2016 | Ritter et al. |
| 2011/0281451 A1 | 11/2011 | Tanis et al. |
| 2013/0121645 A1 | 5/2013 | Haley et al. |
| 2013/0223036 A1 | 8/2013 | Herring et al. |
| 2013/0258587 A1 | 10/2013 | Li et al. |
| 2014/0011396 A1 | 1/2014 | Ritter et al. |
| 2014/0302706 A1 | 10/2014 | YuQiang et al. |
| 2014/0360752 A1* | 12/2014 | Sechrist ............... H05K 7/1447 174/79 |
| 2014/0360753 A1* | 12/2014 | Sechrist ............... H05K 7/1449 174/79 |
| 2014/0362546 A1* | 12/2014 | Sechrist ............... H05K 7/1449 361/752 |
| 2014/0362549 A1* | 12/2014 | Sechrist ................ H04Q 1/15 361/758 |
| 2015/0029675 A1* | 1/2015 | Rossman ............. H05K 7/1447 361/726 |
| 2015/0034356 A1* | 2/2015 | Ritter ...................... H05K 7/02 174/79 |
| 2015/0075856 A1* | 3/2015 | Ritter ...................... H04Q 1/06 174/261 |
| 2015/0129287 A1* | 5/2015 | Ritter .................. H05K 5/0069 174/255 |
| 2015/0200474 A1* | 7/2015 | Rossman ........... H01R 12/7005 439/64 |
| 2016/0276790 A1* | 9/2016 | Simpson ............. H05K 7/1492 |

FOREIGN PATENT DOCUMENTS

| | | |
|---|---|---|
| CN | 103840320 A | 6/2014 |
| CN | 104094474 A | 10/2014 |

OTHER PUBLICATIONS

Office action and search report issued for corresponding Chinese application No. 201511035856.3 dated Sep. 5, 2018.

* cited by examiner

CONNECTOR BRICK FOR CABLE COMMUNICATION SYSTEM

CROSS-REFERENCE TO RELATED APPLICATIONS

This application is a continuation application of, and claims benefit to the filing date of, U.S. patent application Ser. No. 14/550,462, filed Nov. 21, 2014, titled, CONNECTOR BRICK FOR CABLE COMMUNICATION SYSTEM, the subject matter of which is herein incorporated by reference in its entirety.

BACKGROUND OF THE INVENTION

The subject matter herein relates generally to connector bricks for a cable communication system.

Communication systems, such as network systems, servers, data centers, and the like, use large printed circuit boards, known as backplanes or midplanes, to interconnect circuit cards, such as daughtercards, line cards and/or switch cards. The communication systems use high speed differential connectors mounted to the backplane and high speed differential connectors mounted to the line cards and switch cards to transmit signals therebetween. The backplane interconnects the various connectors using traces along the circuit board.

As the density of the systems increase and requirements for high speed lines increase, the printed circuit boards continue to become larger and the signal integrity inherently degrades as the signals travel further along the entire channel. At least some systems have replaced the traditional backplanes with cable assemblies. The cable assemblies need to be held in predetermined locations for mating with line and switch cards. Some known cable communication systems use a cable rack to hold all of the cables and cable connectors of the cable assemblies and a backplane circuit board to precisely locate the cable connectors, guide features and other components for mating with the line and switch cards. However, aligning the many cable connectors with corresponding openings in the backplane circuit board can be difficult during the assembly process as all of the cable connectors need to be properly positioned simultaneously to load the cable rack onto the backplane. Additionally, because the electrical connections of the system are made by cable assemblies, there may not be a need for the backplane circuit board, which may be an expensive component to manufacture. Elimination of the backplane circuit board may reduce the cost of the system.

A need remains for a cable communication system that may be assembled in an easy and timely manner.

BRIEF DESCRIPTION OF THE INVENTION

In one embodiment, a connector brick is provided for a cable communication system that includes a header frame including end spacers and side spacers defining a header opening. The header frame is configured for mating with a circuit card. A plurality of cable connectors are received in the header opening and connected to the header frame. Each cable connector has cables extending therefrom. Each cable connector has a header holding signal contacts at a mating end of the header and configured for mating with a corresponding card connector of the circuit card. Float mechanisms extend from the header frame. The float mechanisms allow limited movement in at least two directions of the header frame. The float mechanisms allow alignment of the header frame with the circuit card. The cable connectors float with the header frame as a unit for mating with the corresponding card connectors.

In another embodiment, a cable communication system is provided that includes a chassis having a frame having a plurality of frame members. Connector bricks are coupled to the frame. Each connector brick includes a header frame including end spacers and side spacers defining a header opening. The header frame is configured for mating with a circuit card and is mounted to at least one of the frame members. A plurality of cable connectors are received in the header opening and connected to the header frame. Each cable connector has cables extending therefrom. Each cable connector has a header holding signal contacts at a mating end of the header and configured for mating with a corresponding card connector of the circuit card. Float mechanisms extend from the header frame. The float mechanisms engage and couple the header frame to the corresponding frame member. The float mechanisms allow limited movement in at least two directions of the header frame relative to the frame. The float mechanisms allow alignment of the header frame with the circuit card. The cable connectors float with the header frame as a unit for mating with the corresponding card connectors.

DETAILED DESCRIPTION OF THE INVENTION

Figure 1:
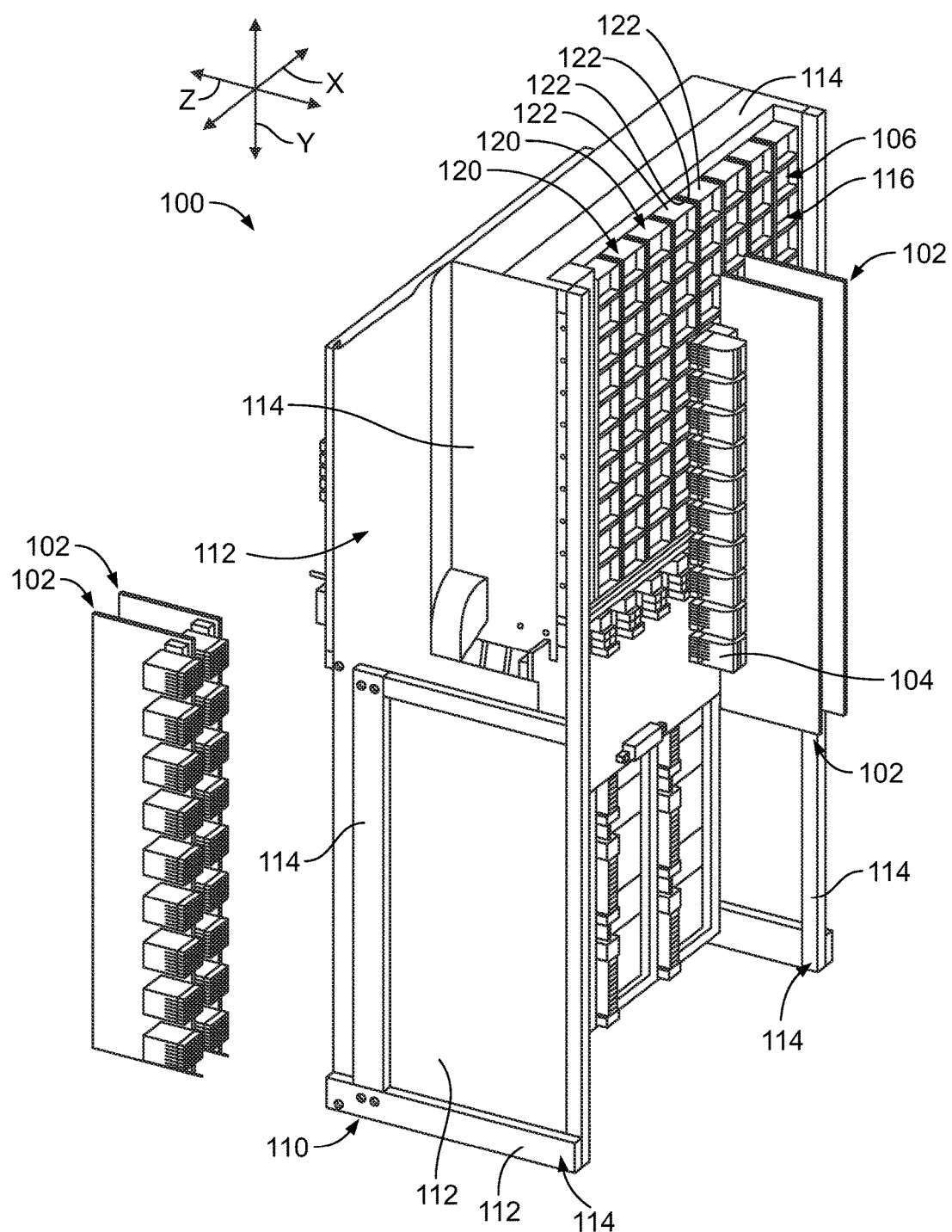
FIG. 1 is a front perspective view of a cable communication system formed in accordance with an exemplary embodiment.

FIG. 1 is a front perspective view of a cable communication system 100 formed in accordance with an exemplary embodiment. The cable communication system 100 is used in a data communication application, such as a network switch. The cable communication system 100 interconnects with circuit cards 102, such as daughtercards, line cards, switch cards, and the like, having card connectors 104. In other embodiments, the cable communication system 100 interconnects with connector or connector assemblies that are cable connectors rather than board mounted connectors. The cable communication system 100 includes a plurality of cable connector assemblies 106 to interconnect the circuit cards 102. The cable communication system 100 may be used to interconnect with other types of connectors and/or cards in other embodiments. The cable communication system 100 may be a backplane system, a mid-plane system, or another type of communication system.

The cable connector assemblies 106 include cable connectors 116 that are interconnected by cables within the cable communication system 100. The cable connector assemblies 106 eliminate interconnections via traces of a circuit board, such as a backplane circuit board, a midplane circuit board, and the like. The cable connector assemblies 106 have improved signal performance along the signal paths between various connectors of the cable communication system 100 as compared to conventional communication systems. The cable connector assemblies 106 support higher speeds and longer signal path lengths as compared to conventional backplanes or midplanes. The cable connector assemblies 106 provide shielding of signal lines for improved signal performance. The cable connector assemblies 106 are packaged in a structure that allows accurate cable and connector location for mating with the corresponding circuit cards 102. The structure manages and organizes the many cables interconnecting the cable connectors 116.

The cable communication system 100 includes a chassis 110 that supports the components of the cable communication system 100. The chassis 110 may include a rack, a cabinet or other suitable structures for holding the components of the cable communication system 100. The chassis 110 may include structures for guiding, supporting and/or securing the circuit cards 102 coupled to the cable communication system 100.

The chassis 110 includes a frame 112 that supports the cable connector assemblies 106 and/or manages the cables of the cable connector assemblies 106. The frame 112 includes a plurality of frame members 114. The frame members 114 may define an open-air cable communication system 100 where the cables are exposed to the external environment. For example, the frame members 114 may be metal support beams or bars forming a rack. In other various embodiments, the frame members 114 may define an enclosed cable communication system 100 where the cables are enclosed in cable channels or raceways. For example, the frame members 114 may include sheet metal pieces forming cable trays to contain the cables. Other types of frame members 114 may be used in various embodiments.

The chassis 110 may include organizer boards or plates coupled to the front and/or rear of the frame 112. The organizer boards may include openings through which one or more of the cable connectors 116 may extend for mating with the circuit cards 102. Optionally, the organizer board may be a circuit board and may be manufactured from typical circuit board material, such as FR-4 material. Electrical components, such as power supplies, fans, fixed connectors, and the like may be mechanically and/or electrically connected to the circuit board. Additionally, components on the organizer board may align, mate or otherwise couple to components on the circuit cards 102. Alternatively, the organizer board may be a sheet metal plate having one or more openings.

In an exemplary embodiment, the cable connectors 116 are arranged together in groups to form a connector brick 120. The connector bricks 120 are coupled to the frame 112. The connector bricks 120 may be oriented vertically, horizontally or at other orientations or combination of orientations. Each connector brick 120 may be independently movable relative to other connector bricks 120, such as for alignment and mating with the corresponding circuit card 102. Optionally, each connector brick 120 is mated to a different circuit card 102. Each connector brick 120 includes a header frame 122 that holds and supports a plurality of the cable connectors 116. Optionally, the connector bricks 120 may be connected to the frame members 114 with some freedom of movement or float in the connection to allow the connector bricks 120 to move relative to one another to independently align the connector bricks 120 relative to the frame 112. For example, the header frame 122 may be connected to the frame members 114 using float mechanisms 124.

The frame 112 holds the connector bricks 120 in rough alignment for mating with the circuit cards 102. Optionally, the connector bricks 120 may have a limited amount of float relative to the frame 112 to allow course alignment of the connector brick 120 with the circuit card 102 during mating. For example, guide features may be provided on the connector brick 120 and on the circuit card 102 that guide mating of the circuit card 102 with the connector brick 120. The cable connectors 116 are moved with the header frame 122 during course alignment and mating with the circuit card 102 such that the cable connectors 116 are positioned within a tolerance for mating with corresponding card connectors 104 of the circuit card 102. In an exemplary embodiment, the connector bricks 120 are movable relative to the frame members 114 to allow the cable connectors 116 to align with the corresponding card connectors 104 during mating. For example, the float mechanisms 124 may allow a limited amount of movement or float in mutually perpendicular X, Y and/or Z directions to allow course alignment of the connector brick 120 with the circuit card 102.

Optionally, each cable connector 116 may have a limited amount of floating movement relative to the header frame 122 to allow for precise positioning or fine alignment of the cable connector 116 for mating with the corresponding card connector 104. For example, the connection between the cable connector 116 and the header frame 122 may allow a limited amount of movement or float in mutually perpendicular X, Y and/or Z directions to allow fine alignment of the cable connector 116 with the corresponding card connector 104 of the circuit card 102. As such, the cable connectors 116 do not need to be precisely positioned prior to mating as the connector brick 120 will provide course alignment and the cable connectors 116 themselves will provide fine alignment during mating.

Figure 2:
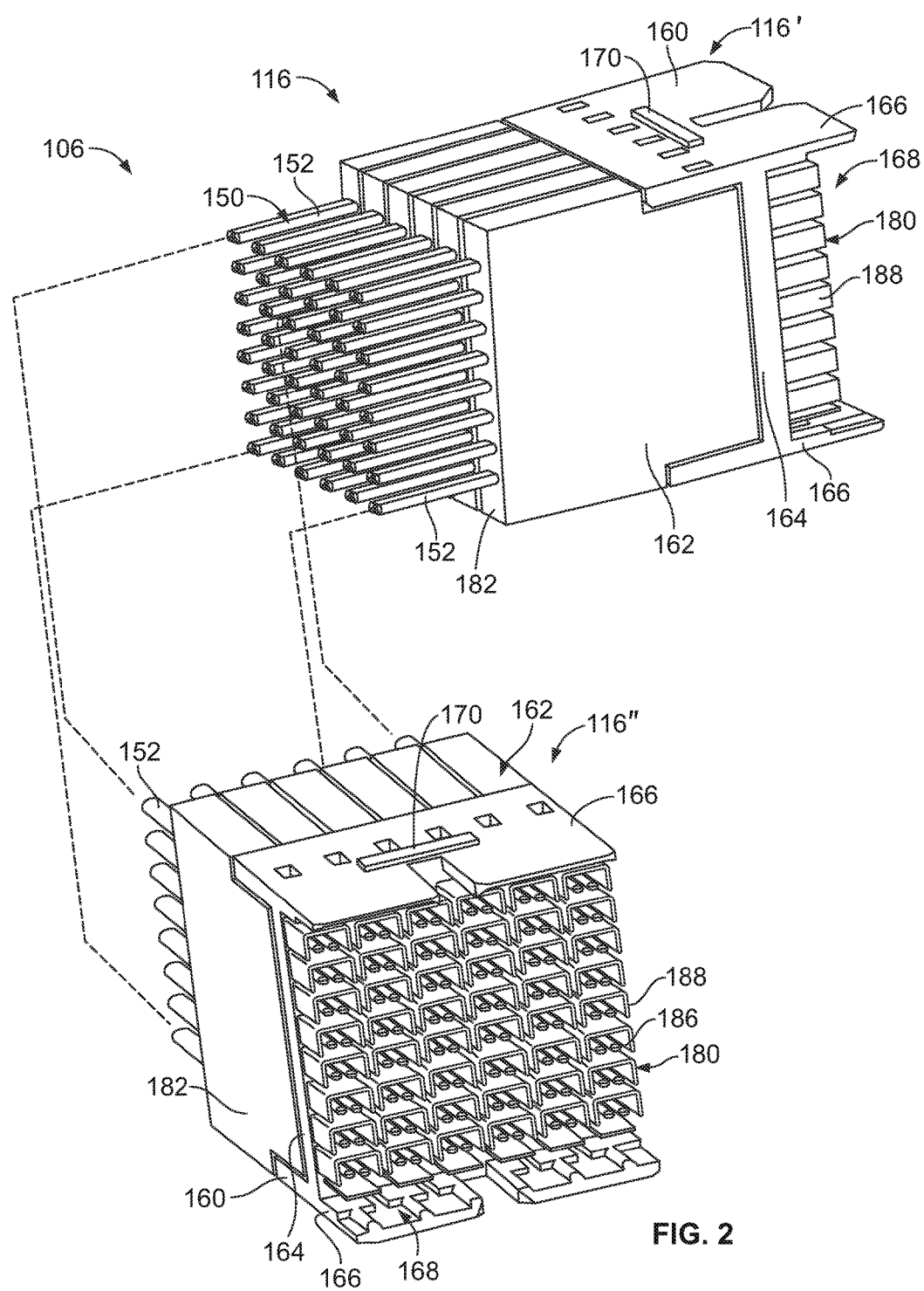
FIG. 2 illustrates a cable connector assembly of the cable communication system.

FIG. 2 illustrates a cable connector assembly 106 formed in accordance with an exemplary embodiment. The cable connector assembly 106 includes a plurality of the cable connectors 116, which may be referred to hereinafter as first and second cable connectors 116', 116", and a cable bundle 150 between the cable connectors 116. Optionally, cables from one cable connector 116' and/or 116" may be routed to multiple, different cable connectors (not shown).

The cable connectors 116 are provided at ends of the cable bundle 150. The cable bundle 150 includes a plurality of cables 152. Optionally, the first cable connector 116' may be connected to a first card connector 104 (shown in FIG. 1) of a first circuit card 102 (shown in FIG. 1) and the second cable connector 116" may be connected to a second card connector 104 of the same or different circuit card 102.

Optionally, the cable connectors 116 may be identical to one another. The cable connectors 116 may define header connectors. The cable connectors 116 are configured to be mated with corresponding card connectors 104, which may be receptacle connectors, such as STRADA Whisper receptacle connectors, commercially available from TE Connectivity, Harrisburg, Pa. In an exemplary embodiment, the cable connector 116 is a high speed differential pair cable connector that includes a plurality of differential pairs of conductors mated at a common mating interface. The differential conductors are shielded along the signal paths thereof to reduce noise, crosstalk and other interference along the signal paths of the differential pairs. Optionally, power conductors may be provided in lieu of or in addition to the signal conductors.

In an exemplary embodiment, the cables 152 are twin axial cables having two signal wires within a common jacket of the cable 152. The signal wires convey differential signals. In an exemplary embodiment, the signal wires are shielded, such as with a cable braid of the cable 152. Optionally, each of the signal wires may be individually shielded. Other types of cables 152 may be provided in alternative embodiments. For example, coaxial cables may extend from the cable connector 116 each carrying a single signal conductor therein.

The cable connector 116 includes a header 160 holding a plurality of contact modules 162. The header 160 includes a base wall 164 and shroud walls 166 extending from the base wall 164 to define a mating cavity 168 configured to receive the corresponding card connector 104. The shroud walls 166 guide mating of the card connector 104 with the cable connector 116, such as to provide fine alignment with the card connector 104 during mating. In an exemplary embodiment, the header 160 has lugs 170 extending outward from the shroud walls 166. The lugs 170 are used to locate the cable connector 116 with respect to the header frame 122 (shown in FIG. 1).

Each of the contact modules 162 includes a plurality of cable assemblies 180 held by a support body 182. Each cable assembly 180 includes a pair of signal contacts 186 terminated to corresponding signals wires of the cable 152. Each cable assembly 180 also includes a ground shield 188 providing shielding for the signal contacts 186. In an exemplary embodiment, the ground shield 188 peripherally surrounds the signal contacts 186 along the entire length of the signal contacts 186 to ensure that the signal paths are electrically shielded from interference. The cable assemblies 180 may be provided with greater or fewer signal contacts 186 in alternative embodiments. The cable assemblies 180 may be provided without the ground shields 188 in alternative embodiments. The cable assemblies 180 may be provided with different shaped ground shields 188 in alternative embodiments. The cable assemblies 180 may provide power in lieu of or in addition to the signals.

The support body 182 provides support for the cable assemblies 180. The cables 152 extend into the support body 182 such that the support body 182 supports a portion of the cables 152. The support body 182 may provide strain relief for the cables 152. Optionally, the support body 182 may be manufactured from a plastic material. Alternatively, the support body 182 may be manufactured from a metal material. The support body 182 may be a metalized plastic material to provide additional shielding for the cables 152 and the cable assemblies 180. Optionally, the support body 182 may include a metal plate electrically connected to each ground shield 188 to electrically common the ground shields 188, and a dielectric overmold overmolded around the cables 152 and portions of the metal plate to support the cables 152 and cable assemblies 180. The contact modules 162 may be provided without the support bodies 182 in alternative embodiments.

Multiple contact modules 162 are loaded into the header 160. The header 160 holds the contact modules 162 in parallel such that the cable assemblies 180 are aligned in parallel columns. Any number of contact modules 162 may be held by the header 160 depending on the particular application. When the contact modules 162 are stacked in the header 160, the cable assemblies 180 may also be aligned in rows. Other types of contact modules 162 and/or cable connectors 116 may be provided in alternative embodiments.

Figure 3:
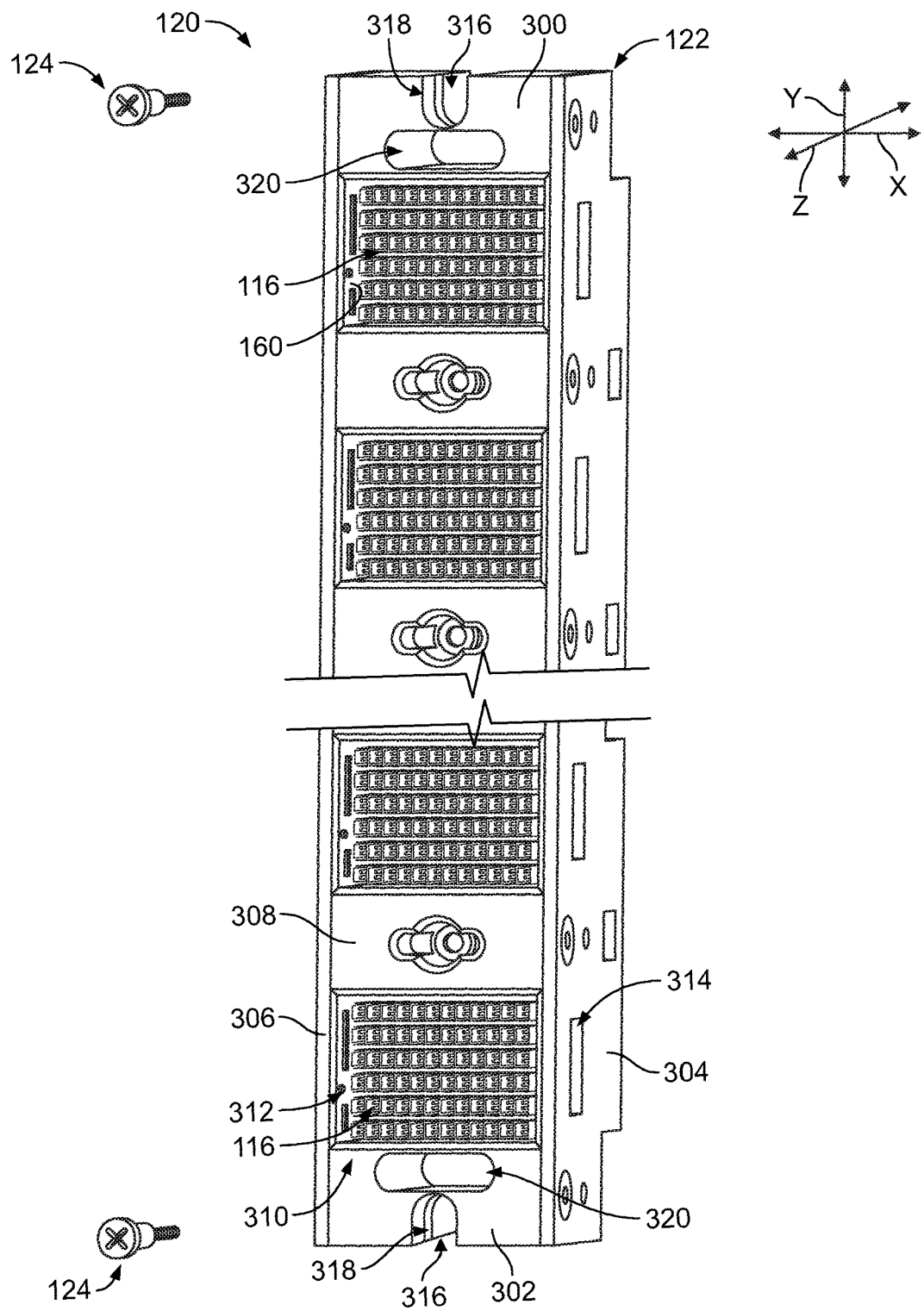
FIG. 3 illustrates a connector brick of the cable communication system and formed in accordance with an exemplary embodiment.

FIG. 3 illustrates one of the connector bricks 120 formed in accordance with an exemplary embodiment. The connector brick 120 includes the header frame 122 that holds the cable connectors 116. In the illustrated embodiment, the header frame 122 include a pair of end spacers 300, 302 and a pair of side spacers 304, 306 extending between the end spacers 300, 302. Optionally, the header frame 122 may include one or more mid-spacers 308 extending between the end spacers 300, 302. The header frame 122 has a mating end 310 that faces outward, such as away from the cables. The mating end 310 may be defined by fronts of the spacers 300, 302, 304, 306, 308.

The side spacers 304, 306 and mid-spacers 308 are blocks positioned between the end spacers 300, 302 to control the spacing between the end spacers 300, 302. The side spacers 304, 306 and mid-spacers 308 may be metal pieces, plastic pieces, or manufactured from other materials. Optionally, the side spacers 304, 306 and mid-spacers 308 may be multi-piece blocks, such as a front block and a rear block, which may be coupled together during assembly, such as to capture portions of the cable connectors 116 therebetween (for example, the lugs 170). The end spacers 300, 302 may be secured to the side spacers 304, 306 and mid-spacers 308, such as by threaded fasteners.

A header opening 312 is defined between the end spacers 300, 302 and the side spacers 304, 306. The header opening 312 extends longitudinally along the end spacers 300, 302 (for example, in a longitudinal direction defined between the side spacers 304, 306) and laterally along the side spacers 304, 306 (for example, in a lateral direction defined between the end spacers 300, 302). The headers 160 of the cable connectors 116 are received in the header opening 312. The header opening 312 may be sized to receive any number of headers 160, such as by lengthening or shortening the end spacers 300, 302. Optionally, the header frame 122 is sized to align the headers 160 in a single row within the header opening 312. For example, the side spacers 304, 306 control the spacing between the end spacers 300, 302 to a single header width. Optionally, the mid-spacers 308 may be positioned between each of the headers 160.

In an exemplary embodiment, the end spacers 300, 302 are generally planar plates having a rectangular shape; however, other shapes are possible in alternative embodiments. The end spacers 300, 302 include elongated alignment slots 314 that receive corresponding lugs 170 (shown in FIG. 2) of the headers 160. The alignment slots 314 may be oversized relative to the lugs 170 to allow a controlled, limited amount of floating movement of the headers 160 relative to the header frame 122. As such, when the connector bricks 120 are held in the frame 112 (shown in FIG. 1), the headers 160 are movable relative to the frame 112, such as for alignment with individual card connectors 104 (shown in FIG. 1). Alternatively, the lugs 170 may be received in elongated alignment slots (not shown) in the side spacers 304, 306 and the mid-spacers 308 rather than in the end spacers 300, 302.

The side spacers 304, 306 have mounting slots 316 that receive the float mechanisms 124. The mounting slots 316 may be open at the exterior side of the side spacers 304, 306. Alternatively, the mounting slots 316 may be closed. The mounting slots 316 include pockets 318 that receive portions of the float mechanisms 124. For example, the float mechanisms 124 may be shoulder screws and the pockets 318 may receive shoulders of the shoulder screws. The float mechanisms 124 are movable within the mounting slots 316. For example, the mounting slots 316 may be oversized to allow a controlled, limited amount of floating movement of the side spacers 304, 306 on the float mechanism 124. The side spacers 304, 306 may be movable in mutually perpendicular X, Y and/or Z directions. For example, in the illustrated embodiment, the side spacers 304, 306 are movable in X and Y directions, which correspond to movement in the longitudinal direction and the lateral direction.

The side spacers 304, 306 have guide features 320, which in the illustrated embodiment are guide openings, which are configured to receive guide pins (not shown) extending from the circuit card 102 (shown in FIG. 1). The guide features 320 are used to guide loading of the connector brick 120 with the circuit card 102.

Figure 4:
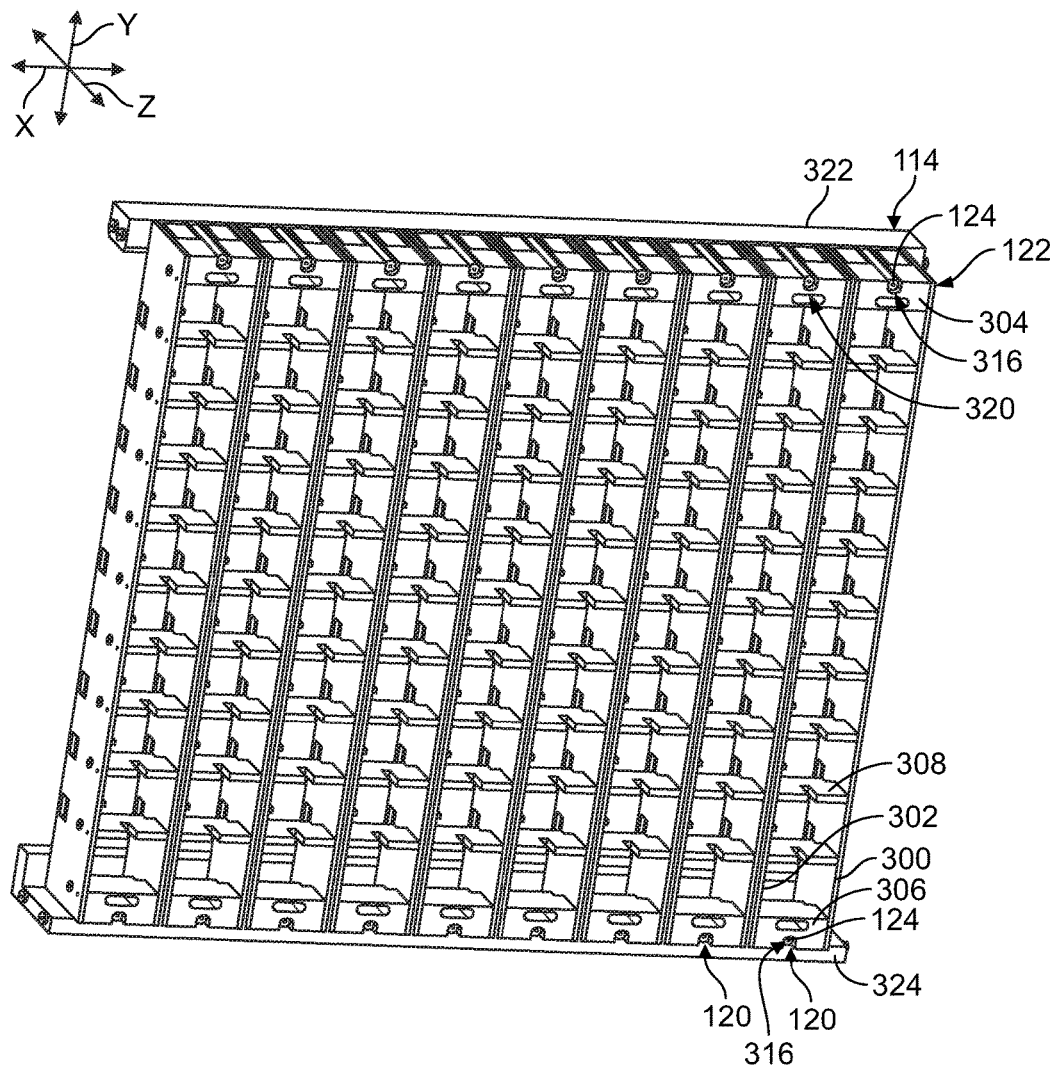
FIG. 4 illustrates a plurality of the connector bricks coupled to a frame of the cable communication system using float mechanisms in accordance with an exemplary embodiment.

FIG. 4 illustrates a plurality of the connector bricks 120 (with cable connectors 116 removed for clarity to illustrate the supporting structure therefore) coupled to the frame 112 using the float mechanisms 124. In an exemplary embodiment, the frame 112 includes upper and lower frame members 322, 324, which may be secured between other frame members 114 (shown in FIG. 1). Each connector brick 120 is assembled by securing the side spacers 304, 306 and mid-spacers 308 between the end spacers 300, 302 using threaded fasteners. The cable connectors 116 (shown in FIG. 1) may be pre-assembled in the connector bricks 120 prior to coupling the connector bricks 120 to the frame members 322, 324.

The connector bricks 120 are coupled to the frame members 322, 324 using the float mechanisms 124. The float mechanisms 124 pass through corresponding mounting slots 316. The float mechanisms 124 may allow vertical and horizontal movement of the connector bricks 120, such as in longitudinal and lateral directions, along the X and Y axes, respectively. The float mechanisms 124 may allow movement in other directions in alternative embodiments. The connector bricks 120 each move as a separate unit. For example, the spacers 300-308 as well as each of the cable connectors 116 may move together as a unit when the circuit card 102 is plugged into or mated with the connector brick 120. For example, the circuit card guide features, such as pins, may be mated with the guide features 320, such as the openings, prior to the cable connectors 116 being mated with the card connectors 104 (shown in FIG. 4) for course alignment of the circuit card 102 with the connector brick 120. The connector brick 120 may manage the insertion force of multiple card connectors 104 during mating. As the circuit card 102 is further mated, the card connectors 104 eventually engage, such as plug into, the headers 160 (shown in FIG. 2). The headers 160 may be movable, such as a limited amount of floating movement, relative to the header frame 122 for fine alignment of each cable connector 116 to the corresponding card connector 104.

The float mechanisms 124 position the connector bricks 120 relative to one another within the frame 112. Optionally, the connector bricks 120 may be positioned immediately adjacent one another, with tolerance to allow a limited amount of float of each connector brick 120. Alternatively, the connector bricks 120 may be spaced apart from one another by a predetermined spacing, such as to accommodate other components, such as space for parts of the circuit cards 102 (shown in FIG. 1).

Figure 5:
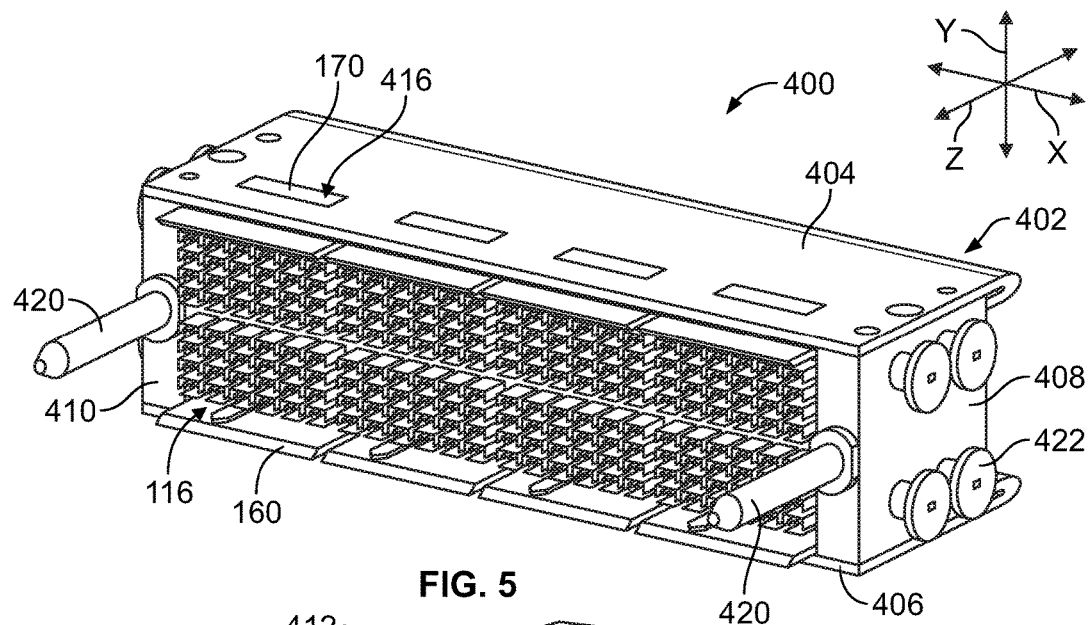
FIG. 5 is a front perspective view of a connector brick formed in accordance with an exemplary embodiment.
Figure 6:
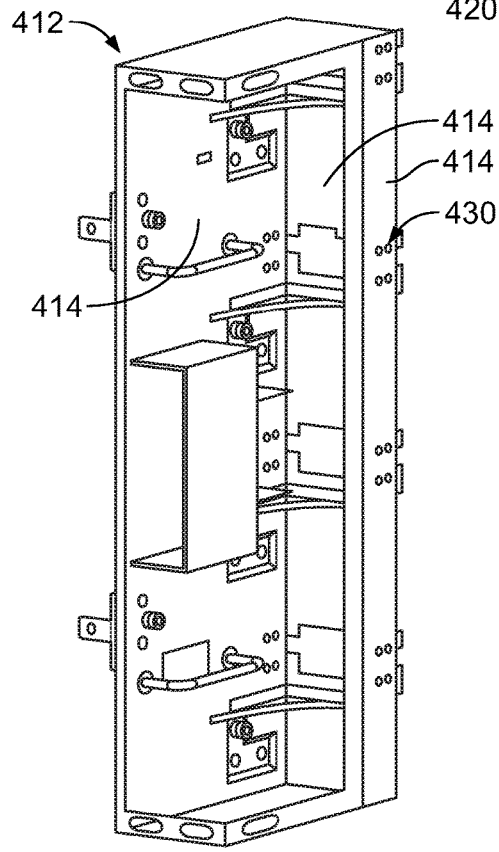
FIG. 6 illustrates a portion of a frame used to support the connector brick shown in FIG. 5.

FIG. 5 is a front perspective view of a connector brick 400 formed in accordance with an exemplary embodiment. FIG. 6 illustrates a portion of a frame 412 used to support the connector brick 400 and formed in accordance with an exemplary embodiment. The frame 412 illustrated in FIG. 6 is different than the frame 112 illustrated in FIG. 1. For example, the frame 412 includes walls, such as sheet metal walls, that define frame members 414 and form a portion of the frame 412.

The connector brick 400 includes a header frame 402 that holds the cable connectors 116. In the illustrated embodiment, the header frame 402 includes a pair of end spacers 404, 406 and a pair of side spacers 408, 410 extending between the end spacers 404, 406. The side spacers 408, 410 are blocks positioned between the end spacers 404, 406 to control the spacing between the end spacers 404, 406. The end spacers 404, 406 may be secured to the side spacers 408, 410 such as by threaded fasteners. Mid-spacers (not shown) may be used in various embodiments.

In an exemplary embodiment, the end spacers 404, 406 are generally planar plates having a rectangular shape; however, other shapes are possible in alternative embodiments. The end spacers 404, 406 include elongated slots 416 that receive corresponding lugs 170 (shown in FIG. 2) of the headers 160, alternative shapes can be used for the slots 416 and lug 170 in alternative embodiments. The slots 416 may be oversized relative to the lugs 170 to allow a limited amount of floating movement of the headers 160 relative to the header frame 402. As such, when the connector bricks 400 are secured to the frame 412 (shown in FIG. 6), the headers 160 are movable relative to the frame 412, such as for alignment with card connectors of a circuit card (not shown).

The side spacers 408, 410 have guide features 420 extending forward therefrom, which in the illustrated embodiment are guide pins. The guide features 420 are used to guide mating of the circuit card with the connector brick 400.

Float mechanisms 422 (FIG. 5) are shown coupled to the side spacers 408, 410. The float mechanisms 422 may be coupled to corresponding frame members 414 (FIG. 6), such as passing through sheet metal plates or walls of the frame 412. The frame members 414 include mounting slots 430 that receive the float mechanisms 422. The mounting slots 430 are openings thorough the frame members 414. Optionally, the mounting slots 430 are oversized relative to the float mechanisms 422 to allow the float mechanisms 422 to float within the mounting slots 430. In an exemplary embodiment, the float mechanisms 422 may not move relative to the side spacers 408, 410, but rather, are able to float with the connector brick 400 relative to the frame members 414 in the oversized mounting slots 430. The float mechanisms 422 may allow vertical and horizontal movement of the connector bricks 400, such as in longitudinal and lateral directions, along the X and Y axes, respectively. The float mechanisms 422 may allow movement in other directions in alternative embodiments.

The connector bricks 400 each move as a separate unit. For example, the spacers 404-410, as well as each of the cable connectors 116, may move together as a unit when the circuit card is plugged into or mated with the connector brick 400. For example, the circuit card guide features, such as openings, may be mated with the guide features 420, such as the pins, prior to the cable connectors 116 being mated with the card connectors for course alignment of the circuit card with the connector brick 400. The float mechanisms 422 position the connector bricks 400 relative to one another within the frame 412.

Figure 7:
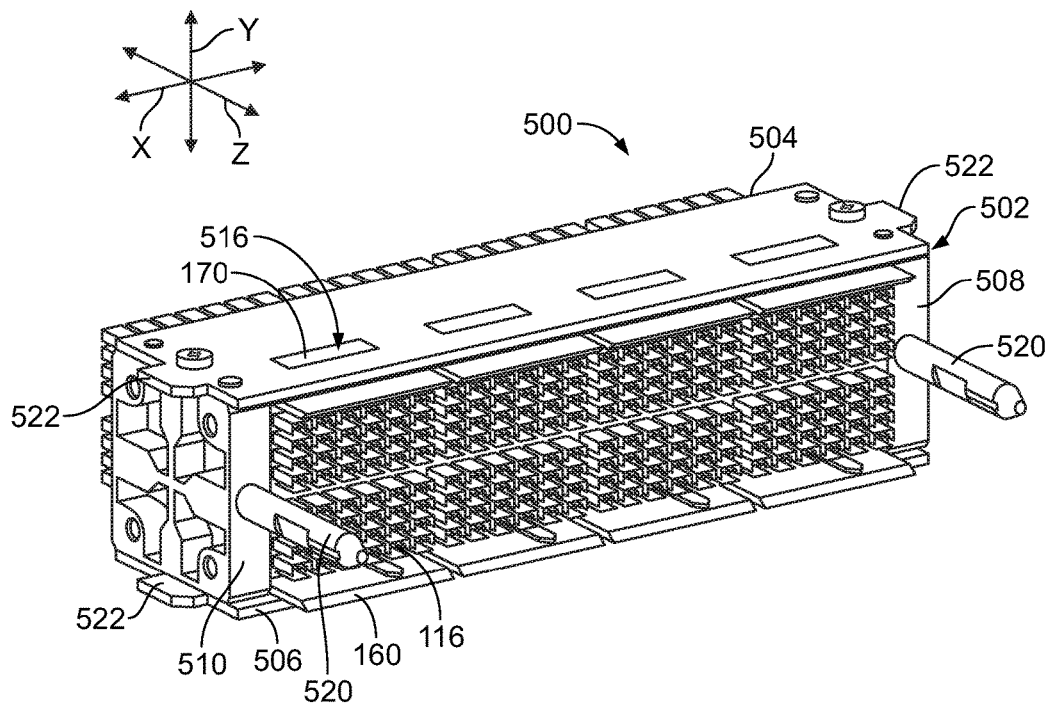
FIG. 7 is a front perspective view of a connector brick formed in accordance with an exemplary embodiment.
Figure 8:
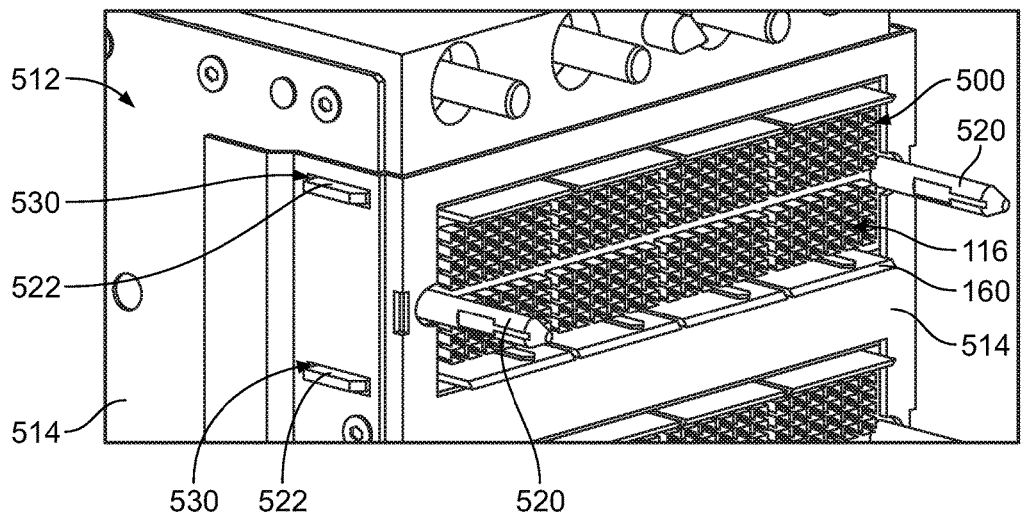
FIG. 8 illustrates a portion of a frame used to support the connector brick shown in FIG. 7.

FIG. 7 is a front perspective view of a connector brick 500 formed in accordance with an exemplary embodiment. FIG. 8 illustrates a portion of a frame 512 used to support the connector brick 500 and formed in accordance with an exemplary embodiment. The frame 512 illustrated in FIG. 6 is different than the frame 112 illustrated in FIG. 1. For example, the frame 512 includes walls, such as sheet metal walls, that define frame members 514 and form a portion of the frame 512.

The connector brick 500 includes a header frame 502 that holds the cable connectors 116. In the illustrated embodiment, the header frame 502 includes a pair of end spacers 504, 506 and a pair of side spacers 508, 510 extending between the end spacers 504, 506. The side spacers 508, 510 are blocks positioned between the end spacers 504, 506 to control the spacing between the end spacers 504, 506. The side spacers 508, 510 have guide features 520 extending forward therefrom, which in the illustrated embodiment are guide pins. The guide features 520 are used to guide mating of the circuit card with the connector brick 500. Mid-spacers (not shown) may be used in various embodiments. The end spacers 504, 506 may be secured to the side spacers 508, 510 and/or mid-spacer(s), such as by threaded fasteners.

In an exemplary embodiment, the end spacers 504, 506 are generally planar plates having a rectangular shape; however, other shapes are possible in alternative embodiments. The end spacers 504, 506 include elongated slots 516 that receive corresponding lugs 170 (shown in FIG. 2) of the headers 160. The slots 516 may be oversized relative to the lugs 170 to allow a limited amount of floating movement of the headers 160 relative to the header frame 502. As such, when the connector bricks 500 are secured to the frame 512 (shown in FIG. 8), the headers 160 are movable relative to the frame 512, such as for alignment with card connectors of a circuit card (not shown).

In an exemplary embodiment, the end spacers 504, 506 have float mechanisms 522 extending therefrom. The float mechanisms 522 are elongated tabs extending outward from opposite sides of the end spacers 504, 506. Optionally, the float mechanisms 522 may be chamfered. The float mechanisms 522 may be in-plane with the end spacers 504, 506. Optionally, the float mechanisms 522 may extend beyond the side spacers 508, 510.

The float mechanisms 522 may be coupled to corresponding frame members 514 (FIG. 6), such as passing through sheet metal plates or walls of the frame 512. The frame members 514 include mounting slots 530 that receive the float mechanisms 522. The mounting slots 530 are openings thorough the frame members 514. Optionally, the mounting slots 530 are oversized relative to the float mechanisms 522 to allow the float mechanisms 522 to float within the mounting slots 530. The float mechanisms 522 are able to float with the connector brick 500 relative to the frame members 514 in the oversized mounting slots 530. The float mechanisms 522 may allow vertical and horizontal movement of the connector bricks 500, such as in longitudinal and lateral directions, along the X and Y axes, respectively. The float mechanisms 522 may allow movement in other directions in alternative embodiments.

The connector bricks 500 each move as a separate unit. For example, the spacers 504-510, as well as each of the cable connectors 116, may move together as a unit when the circuit card is plugged into or mated with the connector brick 500. For example, the circuit card guide features, such as openings, may be mated with the guide features 520, such as the pins, prior to the cable connectors 116 being mated with the card connectors for course alignment of the circuit card with the connector brick 500. The float mechanisms 522 position the connector bricks 500 relative to one another within the frame 512.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A connector brick for attachment to frame members of a frame of a cable communication system, the connector brick comprising:

a header frame including end spacers and side spacers defining a header opening, the end spacers being plates having alignment slots, the side spacers extending between the end spacers to define the header opening, the header frame being configured for mating with a circuit card;

a plurality of cable connectors received in the header opening being positioned between and engaging the end spacers to hold the positions of the cable connectors relative to the header frame, each cable connector having cables extending therefrom, each cable connector having a header holding signal contacts at a mating end of the header and configured for mating with a corresponding card connector of the circuit card, the headers of the cable connectors including alignment lugs received in corresponding alignment slots, the alignment slots being oversized to allow a limited amount of floating movement of the headers relative to the end spacers;

float mechanisms extending from the header frame for connection to the corresponding frame member, the float mechanisms allowing limited movement in at least two directions of the header frame relative to the frame member, wherein the float mechanisms allow alignment of the header frame with the circuit card, the cable connectors floating with the header frame as a unit for mating with the corresponding card connectors.

2. The connector brick of claim 1, wherein the header frame includes a mating end defined by fronts of the end spacers and fronts of the side spacers, the mating end extending longitudinally and laterally, the float mechanisms allowing movement of the header frame in a longitudinal direction and in a lateral direction.

3. The connector brick of claim 1, wherein the float mechanisms comprise shoulder screws.

4. The connector brick of claim 1, wherein the si-de end spacers comprise mounting slots receiving the float mechanisms, the mounting slots being oversized relative to the float mechanisms to allow a limited amount of floating movement of the header frame relative to the float mechanisms.

5. The connector brick of claim 1, wherein the float mechanisms comprise tabs extending from the end spacers, the tabs being configured to be received in float slots in the frame of the cable communication system used to support the connector brick.

6. The connector brick of claim 1, further comprising mid-spacers extending between the end spacers in the header opening, the mid-spacers being positioned between cable connectors.

7. The connector brick of claim 1, wherein the end spacers are planer plates, the side spacers extend between the end spacers to define the header opening, the header frame including mid-spacers extending between the end spacers in the header opening, the mid-spacers being positioned between cable connectors, the mid-spacers and side spacers including alignment slots, the headers of the cable connectors including alignment lugs received in corresponding alignment slots, the alignment slots being oversized to allow a limited amount of floating movement of the headers relative to the header frame.

8. The connector brick of claim 1, wherein the header frame includes guide features configured to mate with corresponding circuit card guide features of the circuit card, the guide features aligning the header frame and cable connectors with the circuit card as a unit for mating the cable connectors with corresponding card connectors.

9. The connector brick of claim 8, wherein the side spacers comprise the guide features, aligning movement of the guide features of the side spacers with the circuit card guide features causes corresponding aligning movement of the side spacers and the cable connectors.

10. A connector brick for attachment to frame members of a frame of a cable communication system, the connector brick comprising:
a header frame including end spacers and side spacers defining a header opening, the header frame being configured for mating with a circuit card;
a plurality of cable connectors received in the header opening and connected to the header frame, each cable connector having cables extending therefrom, each cable connector having a header holding signal contacts at a mating end of the header and configured for mating with a corresponding card connector of the circuit card;
float mechanisms extending from the header frame for connection to the corresponding frame member, the float mechanisms allowing limited movement in at least two directions of the header frame relative to the frame member, wherein the float mechanisms allow alignment of the header frame with the circuit card, the cable connectors floating with the header frame as a unit for mating with the corresponding card connectors, wherein the float mechanisms comprise shoulder screws extending outward from the side spacers, the shoulder screws configured to be received in float slots in the frame of the cable communication system used to support the connector brick.

11. The connector brick of claim 10, wherein the end spacers are planer plates, the side spacers extending between the end spacers to define the header opening, the cable connectors being positioned between and engaging the end spacers to hold the positions of the cable connectors relative to the header frame.

12. The connector brick of claim 11, wherein the end spacers include alignment slots, the headers of the cable connectors including alignment lugs received in corresponding alignment slots, the alignment slots being oversized to allow a limited amount of floating movement of the headers relative to the end spacers.

13. A cable communication system comprising:
a chassis having a frame having a plurality of frame members;
connector bricks coupled to the frame, each connector brick comprising:
a header frame including end spacers and side spacers defining a header opening, the end spacers being plates having alignment slots, the side spacers extending between the end spacers to define the header opening, the header frame being configured for mating with a circuit card, the header frame being mounted to at least one of the frame members;
a plurality of cable connectors received in the header opening being positioned between and engaging the end spacers to hold the positions of the cable connectors relative to the header frame, each cable connector having cables extending therefrom, each cable connector having a header holding signal contacts at a mating end of the header and configured for mating with a corresponding card connector of the circuit card, the headers of the cable connectors including alignment lugs received in corresponding alignment slots, the alignment slots being oversized to allow a limited amount of floating movement of the headers relative to the end spacers;
float mechanisms extending from the header frame for connection to the corresponding frame member, the float mechanisms engaging and coupling the header frame to the corresponding at least one frame member, the float mechanisms allowing limited movement in at least two directions of the header frame relative to the frame member of the frame of the chassis, wherein the float mechanisms allow alignment of the header frame with the circuit card, the cable connectors floating with the header frame as a unit for mating with the corresponding card connectors.

14. The cable communication system of claim 13, wherein the header frame includes a mating end defined by fronts of the end spacers and fronts of the side spacers, the mating end extending longitudinally and laterally, the float mechanisms allowing movement of the header frame in a longitudinal direction and in a lateral direction.

15. The cable communication system of claim 13, wherein the float mechanisms comprise shoulder screws.

16. The cable communication system of claim 13, wherein the end spacers comprise mounting slots receiving the float mechanisms, the mounting slots being oversized relative to the float mechanisms to allow a limited amount of floating movement of the header frame relative to the float mechanisms.

17. The cable communication system of claim 13, wherein the float mechanisms comprise shoulder screws extending outward from the side spacers, the shoulder screws configured to be received in mounting slots in corresponding frame members, the mounting slots being oversized to allow a limited amount of floating movement of the shoulder screws in the mounting slots.

18. The cable communication system of claim 13, wherein the float mechanisms comprise tabs extending from the end spacers, the tabs being configured to be received in mounting slots in corresponding frame members, the mounting slots being oversized to allow a limited amount of floating movement of the shoulder screws in the mounting slots.

19. The cable communication system of claim 13, wherein the header frame includes guide features configured to mate with corresponding circuit card guide features of the circuit card, the guide features aligning the header frame and cable connectors with the circuit card as a unit for mating the cable connectors with corresponding card connectors.

20. The cable communication system of claim 19, wherein the side spacers comprise the guide features, aligning movement of the guide features of the side spacers with the circuit card guide features causes corresponding aligning movement of the side spacers and the cable connectors.

* * * * *